May 23, 1939.  F. FISCHER  2,159,142
AUTOMATIC RUDDER CONTROL FOR AIRCRAFT
Filed April 26, 1938  2 Sheets-Sheet 1
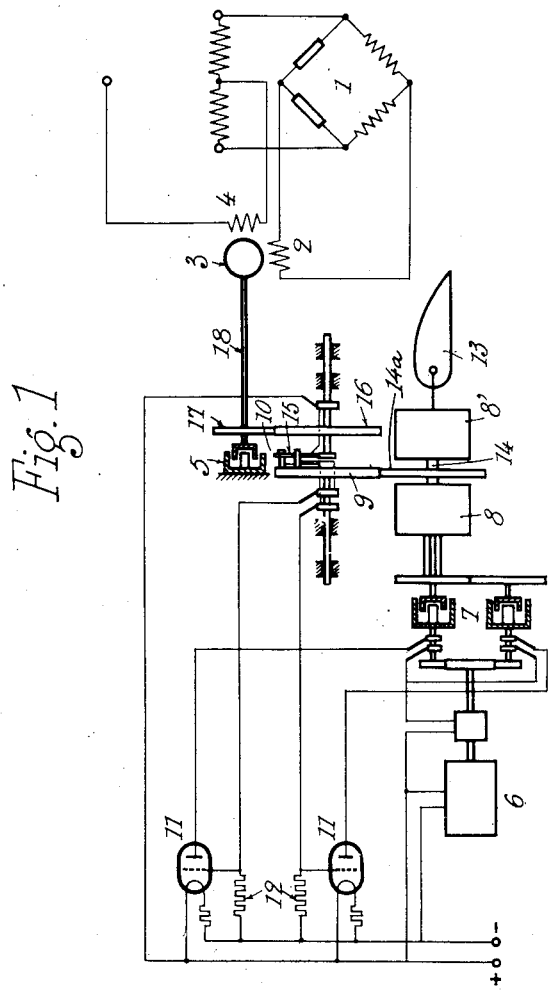
INVENTOR
FRANZ FISCHER
BY Stephen Cerstvik
ATTORNEY May 23, 1939.  F. FISCHER  2,159,142
AUTOMATIC RUDDER CONTROL FOR AIRCRAFT
Filed April 26, 1938  2 Sheets-Sheet 2
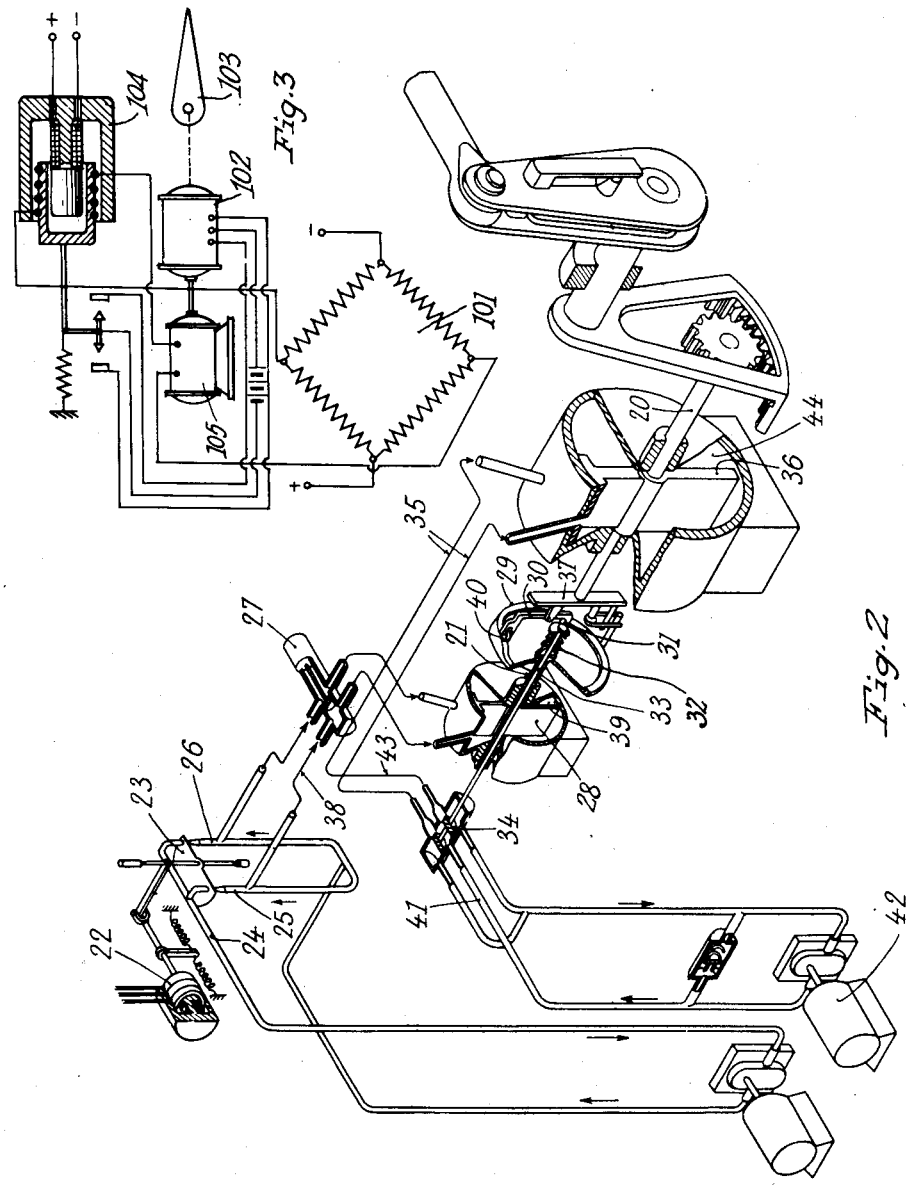
INVENTOR
FRANZ FISCHER
BY Stephen Curtwick
ATTORNEY Patented May 23, 1939

2,159,142

UNITED STATES PATENT OFFICE 2,159,142

AUTOMATIC RUDDER CONTROL FOR AIRCRAFT

Franz Fischer, Berlin-Wilmersdorf, Germany, assignor to Siemens Apparate und Maschinen Gesellschaft mit beschrankter Haftung, Berlin, Germany, a corporation of Germany Application April 26, 1938, Serial No. 204,485
In Germany April 28, 1937

10 Claims. (Cl. 244—76)

The invention relates to an automatic rudder control for craft, in particular for aircraft, in which according to the invention a control surface, to be adjusted, is controlled independent of the load with a velocity corresponding to a pregiven value.

A further object of the invention is, that the velocity of the controlling process is adjustable with the aid of a comparative arrangement which is connected, on the one hand, to a transmitter furnishing a value corresponding to the calculated velocity of the controlling process, and, on the other hand, to a signalling or checking transmitter, furnishing a value proportional to the effective velocity of the controlling process. These two values are compared with one another in the said arrangement and from this is derived the control effect for the velocity of the controlling process.

According to a further object of the invention, two mechanical values, for instance, two speeds, can be compared with the aid of the comparative arrangement and from this will be derived the desired controlling effect. Instead of the mechanical values two electrical values may be compared with one another and used for furnishing the controlling effect.

These and further objects of the invention will be disclosed by the specification, setting out in detail examples of the modes of construction as shown in the drawings. These examples of the modes of construction represent only possible, not exclusive forms for the realisation of the invention. Other modes of construction will be possible without departing from the spirit of the invention.

Referring to the drawings—

Figure 1 is a diagrammatic representation of an automatic rudder control utilizing an electric controlling arrangement.

Figure 2 is a perspective view partly in section illustrating an hydraulic control.

Figure 3 is a diagrammatic representation of a modified electric control arrangement.

As impulse transmitter is used a device not shown in the drawings. This may be, for example, a rate of turn device or a directional gyro or other indicating instrument indicating the deviation of a craft from a position with respect to one of its axes. This indicator operates on a bridge connection marked 1, which, for instance, may be a bolometer bridge whereby the resistance of one or more arms of the bridge is varied in proportion to the indication of the instrument. The differential current produced by resistance variation is proportional to the deflection of the pointer of the indicating instrument. This differential current passes through a winding 2, diagonally arranged with respect to the bridge said winding comprising one phase of a two-phase motor 3, whose other winding 4 is energized by a constant current, having a phase displacement of 90°. The torque of the two-phase motor 3 will then be proportional to the deflection of the indicating instrument. A load is placed upon the motor by an eddy current brake 5, so that its speed will be proportional to the torque and therefore proportional to the deflection of the indicating element.

The driving shaft for the rudder 13, which is illustrated schematically only in Fig. 1, is driven by a continually running driving motor 6 by means of two eddy current couplings 7 and by means of the gear assemblies 8, 8'. On an intermediate shaft 14 is mounted a gear 14a, by means of which the speed of rotation shaft 14 is transmitted to a gear 9 provided with contacts. On the gear 9 are arranged two easily moveable contacts 10, cooperating with a counter contact 15. The counter contact is mounted on a gear 16, co-operating with a gear 17. The gear 17 is mounted on the shaft 18 of the variable speed two-phase motor 3.

This arrangement represents a mechanical comparative arrangement, in which are compared on the one hand, the speed of the shaft 18 of the two-phase motor 3 and, on the other hand, the speed of the intermediate shaft 14 of the controlling gear. In the case of the shaft 14 having a lower speed than the shaft 18, so that it is lagging with respect to the shaft 18, one of the two contacts 10 will come in contact with the counter contact 15. If the speed of the shaft 14 is higher than that of the shaft 18, so that it is leading with respect to the shaft 18, the other of the two contacts 10 will come in contact with the counter contact 15. From this will be derived a controlling effect determining the velocity of the controlling process. In the present example of the mode of construction the controlling effect is transmitted to the said eddy current couplings 7 in such a manner, that the speed of the shaft 14 corresponds exactly to the speed of the shaft 18. The controlling effect may also be transmitted directly to the driving motor 6 adjusting the velocity of the latter corresponding to the desired controlling velocity.

For the transmission of the controlling effect to the eddy current couplings 7 are provided as shown in Fig. 1 amplifier tubes 11, the grid of which is receiving by way of a very high resistance 12 so high a negative potential that no anode current will be passing. Owing to the co-operation of one or the other of the two contacts 10 with the counter contact 15, the grid of one or the other of the two amplifier tubes 11 will be grounded, causing the full anode current to pass through the tube and the corresponding eddy current coupling. In this way one or the other of the two eddy current couplings will be made to act, depending on whether the controlling shaft 14 is leading or lagging.

In the example of the mode of construction shown in Figure 2, the control driving shaft is designated by 20, and the standard speed shaft by 21. The impulse determining the value of the standard speed is controlled by a device 22, actuating a diaphragm 23 of a differential oil pressure device. Depending on the position of the diaphragm, the pressure will be blocked on the impulse line 25 or 26. The differential pressure is led over a short-circuiting slide 27, to a rotating piston 28, mounted on the shaft 21 carrying the controlling cam 29. Co-operating with the controlling cam 29 is a pivoted lever 30, against the valve tappet 33, controlled by a spring 32, and operating a controlling slide 34. The lines 35 lead from the controlling slide 34 to the rotating servomotor 36 on the rudder driving shaft 20. The rudder driving shaft carries the follow-up lever 37 on which is mounted the lever 30. The operation of this arrangement is as follows:

Supposing the diaphragm 23 is so oscillated that the cross section of the nozzle outlet of the conduit 25 is enlarged and that of the conduit 26 is decreased, the pressure in the conduit 26 and in consequence thereof the pressure at the side 29 of the rotating piston 28 would be increased. The rotating piston 28 and in consequence thereof the shaft 21 will be swung around in clockwise direction. In doing so the roller 40 moves downwards on the controlling cam 29; and the spring 32 will then be able to slide the rod 33 towards the right, so that the pressure conduit 41 of the pump 42 will be connected with the line 43. The cylinder space 44 will be fed by pressure oil in appropriate quantities and the rotating piston 36 is caused thereby to follow the standard rotating piston 28. In doing so the follow-up 37 rotates lever 30 so that roller 40 moves up again on the controlling cam 29 and the slide 34 is closed.

The invention can be further developed to advantage by making use of an electric comparative arrangement. With this arrangement the utilization of a standard speed generator as described in the foregoing is obviated. The value corresponding to the calculated value of the desired controlling velocity, which with the aid of the bridge connection is transformed into an electric value, is compared in this arrangement with an electric value proportional to an effective value of the controlling process and the desired controlling action is derived from the difference between the effects of these two values. Referring to Figure 3 it is again supposed an impulse transmitter, not shown in the drawings, supplies an indication corresponding to the velocity of the deviation of the craft from its calculated position. This transmitter, again, operates on a bridge connection represented at 101, which, for instance, may be a bolometer bridge, the resistances of which are changed in two arms of the bridge connection by variation in flow of cooling air against the arms of the bridge. The electrical value, existing in the diagonal 101, for instance, the voltage, represents a value corresponding to the calculated velocity of the controlling process. The controlling motor 102, serving for the control of a control surface, is to be adjusted in accordance with this calculated velocity. The putting into service of the controlling motor is effected with the aid of a plunger type coil 104, arranged in the diagonal of the bridge connection. To the controlling motor, there is therefore imparted a rotating movement in one or the other direction, according to the excitation of a plunger type coil. In order to make the running velocity of the motor proportional to the voltage of the bridge diagonal, a tachometer dynamo is connected to the controlling motor, the voltage of the tachometer dynamo being directly proportional to its speed. The tachometer dynamo is connected in opposition to the coil in the diagonal of the bridge connection. There will be therefore, no current in the plunger coil, if the voltage supplied by the tachometer dynamo is equal and opposite to the voltage of the diagonal. The controlling process takes place in the following manner: By a disturbance of the equilibrium, which may be of any kind, there is established in the bridge a certain voltage, causing the coil to respond to thereby actuate motor 102 in one direction or the other. As soon as motor 102 begins to rotate, the consequent rotation of dynamo 105 generates a voltage therein which opposes the voltage of winding 104 whereby the speed of the motor is properly maintained. When the voltages are equal and opposite the motor is disconnected. This goes to show, that the speed of the motor increases in keeping with the increase of the bridge tension 101, and that the motor is disconnected at such lower speeds as are corresponding to the lower value supplied by the impulse transmitting device. The comparison of tension in this electric comparative arrangement represents, electrically, that which is shown in the examples of the modes of construction of the Figures 1 and 2 with the aid of the comparative arrangements provided in these cases for the purposes of comparing two mechanical values, viz., two speeds.

What is claimed is:

1. In a control device for aircraft, movable means for controlling the position of said craft with respect to a chosen axis thereof, means producing an effect proportional to the amount of deviation of said craft from said axis, means producing an effect proportional to the rate of movement of said movable means, means for comparing these effects, and means controlled in response to said comparing means for controlling the operation of the first-named controlling means.

2. In a control device for aircraft, movable means for controlling the position of said craft with respect to a chosen axis thereof, means producing an effect proportional to the rate of deviation of said craft from said axis, means producing an effect proportional to the rate of movement of said movable means, means for comparing these effects, and means controlled in response to the value of this comparison for controlling the operation of the first-named controlling means.

3. In a control device for aircraft, movable means for controlling the position of said craft with respect to a chosen axis thereof, means producing a force proportional to the deviation of said craft from said axis, means rotating an element at a speed proportional to said force, means rotating another element at a speed proportional to the rate of movement of said movable means, means for comparing these speeds, and means controlled in response to said comparing means for controlling the operation of the first-named controlling means.

4. In a control device for aircraft, movable means for controlling the position of said craft with respect to a chosen axis thereof, a Wheatstone bridge, means producing an electrical unbalance in said bridge proportional to a measured quantity, means producing a force proportional to said unbalance, means producing a force proportional to the rate of movement of said movable means, means for comparing these forces, and means controlled in response to said comparing means for controlling the operation of the first-named controlling means.

5. In a control device for aircraft, movable means for controlling the position of said craft with respect to a chosen axis thereof, a Wheatstone bridge, means producing an electrical unbalance in said bridge proportional to a measured quantity, means producing rotation of an element proportional to said unbalance, means producing rotation of another element proportional to the rate of movement of said movable means, means for comparing these rotations, and means responsive to the comparative values of said rotations to control the movement of the first-named controlling means.

6. In a control device for aircraft, movable means for controlling the position of said craft with respect to a chosen axis thereof, a first rotatable element, means producing rotation of said element in proportion to a measured quantity, means controlled by said rotation for producing a rotation of a second element in proportion to the rotation of said first element, means varying the rotation of said first element and proportional to the comparative values of said rotations, and means controlled by the rotation of said second element for operating the first-named controlling means.

7. In a control device for aircraft, movable means for controlling the position of said craft with respect to a chosen axis thereof, a reciprocable element, means producing movement of said element in proportion to the value of a measured quantity, means controlled by said reciprocable element and causing an actuation of said controlling means, and means operative upon actuation of said controlling means producing a force opposing said movement of said reciprocable element whereby the actuation of the controlling means is proportional to the value of said measured quantity.

8. In a control device for aircraft, movable means for controlling the position of said craft with respect to a desired axis thereof, a Wheatstone bridge, means producing an electrical unbalance of said bridge proportional to a measured quantity, an electrical motor, means controlled by said unbalance for producing rotation of said motor proportional to the amount of said unbalance, means producing rotation of an element proportional to the movement of said movable means, means for comparing the rotation of said motor and said rotating element, and means including an eddy current coupling for actuating said controlling means, the current through said coupling being controlled by said comparing means.

9. In a control device for aircraft, movable means for controlling the position of said craft with respect to a desired axis thereof, a source of fluid pressure, means controlling said pressure in proportion to a measured quantity, rotatable means, means for rotating said means by said fluid pressure, a second rotatable means, means for rotating said second means by said fluid pressure, means controlled by said second rotatable means for actuating said controlling means, means responsive to the rotation of said first rotatable means for controlling the pressure supplied to said second rotatable means, and means controlled by the rotation of said second rotatable means for actuating said pressure controlling means.

10. In a control device for aircraft, movable means for controlling the position of said craft with respect to a desired axis thereof, a Wheatstone bridge, means producing an electrical unbalance in said bridge proportional to a measured quantity, an electrical plunger type coil, means producing actuation of said coil in proportion to the effect produced by said electrical unbalance, an electrical motor connected to said movable means for actuation thereof, means controlled by said coil for controlling said motor, and means operated in proportion to the rate of rotation of said motor for producing an electrical force in said coil opposing said unbalance effect.

FRANZ FISCHER.